Figure 1:
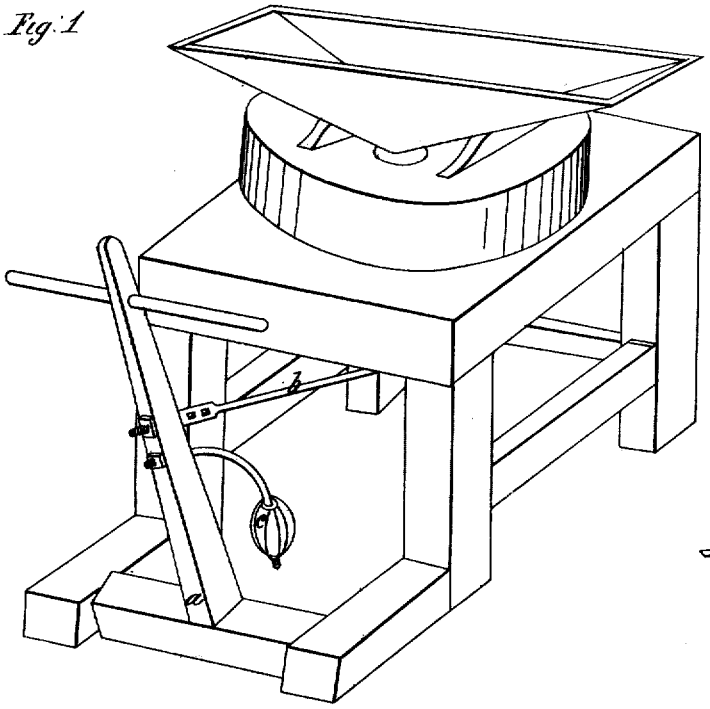
Figure 2:
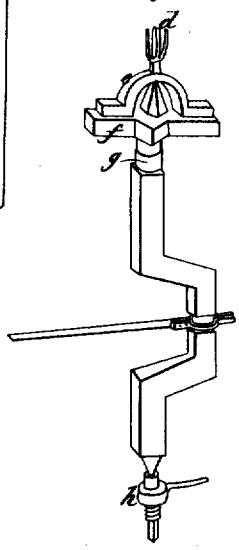
Figure 3:
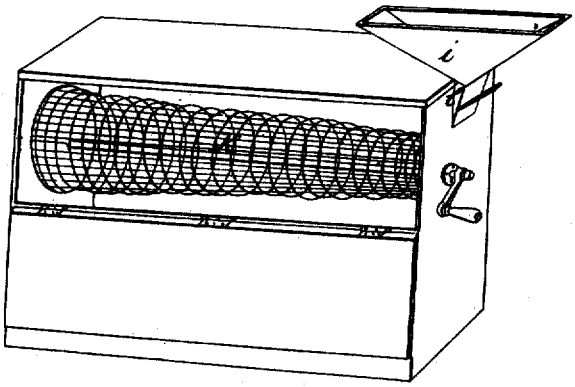

NO PRINTED COPY OF SPECIFICATION IN OFFICE.

8771X

P. M. Wright.

Grist Mill.

Patented Apr. 14, 1835.

Apl. 14. 1835 8771X 4/14/1835 561

Peter M Wright City & State New York

Letters Patent

The schedule referred to in these Letters Patent and making part of the same
containing a description in the words of the said Peter M Wright himself of his
improvement in the construction of a family Grist Mill.

To all to whom these presents shall come. Be it known that I Peter M Wright of
the City of New York in the State of New York have invented a new and useful construction of a Family
Grist Mill the properties of which as follows are a full and exact description
of the same. The description I shall give will be as plain and explicit as the
machine in all its parts is simple for an exemplification of which parts I refer to
the drawings and references ~~and at the foot of this Specification~~ lay down [illegible]
original and which I claim I shall proceed to discuss in a few words the princi-
ple of the same. The first of which are that the great amount of friction which
attends those constructions of mills whose motions are obtained by a multiplica-
tion of cog wheels and pinions is in my construction I think obviously avoided
by the application of a crank spindle, to be sure by the multiplication of cog
wheels and pinions the velocity of the stones are increased and of course the acting
power diminished and a great quantity of grain ground but as these mills
are not intended to grind for a host velocity is not required neither does it ap-
pear that the flour is ground better but on the contrary is heated and thence
out to the injury of its good qualities. In fact in a small degree my construc-
tion will admit of various qualities of action for by the upright lever attached to
one end of the working rod it is evident may be made as well a lever of the second
a third class or no lever at all by the direct action upon the working rod.
The radius of this spindle may be increased
to a greater extent than in the present case and be sufficiently strong to bear at least
three hundred pounds and what velocity may still be maintained by a lever
of third class without any diminution of power but rather an increase.
In the next place it possesses these various qua-
lities of action which is understood by the working of a crane and that in

8771X various ways of frequent changes and possitions of the body both conducive
to his mental and physical powers as in the manner of rowing standing
or sitting nor is it confined to the narrow limits of a crank motion
where the position of one man only can well be sustained, but by lengthening
the arms of the lever the exertion of several may be applyed.
Another advantage in this construction is that
the cumbersome aid of the fly wheel is dispenced with and its necessary quali-
ties as a continuer and equalizer of motion is obtained by the weight at-
tached to the lever. In relation to the bolt it possesses these advantages that in-
stead of a standing as common it is made in the form of a conical cylinder which
maintains a more regular motion and gives the flour more time in making its
way through as the bolt is small it may be turned in any manner either
by hand or feet. A few words may be said in relation to the step of the spindle
in combination with the regulator that its construction is simple and saves
the spindle exactly perpendicular other things may be mentioned such as
securing the damsel upon the head of the spindle regulating the bearing upon the journals
of the spindle and the manner of conducting or letting the flour into the bolt all
of which it is understood are sufficiently explained in the references and
drawings. The claims made in this machine and herein specified are to-
gether with its construction the application of the crank spindle working
rod & lever the securing of the damsel upon the head of the spindle the manner
of regulating and letting the flour into the bolt and the conical form of the
same.

Witnesses
R. Rowley
C. A. Bryson

Peter M. Wright (Drawing)

[illegible] 780 wds